United States Patent
Hübner et al.

[15] 3,691,380
[45] Sept. 12, 1972

[54] THRESHOLD VALUE DOSAGE METER

[72] Inventors: Klaus Hübner; Konrad Prokert; Werner Stolz, all of Dresden, Germany

[73] Assignee: VEB Fluorwerke Dohna, Donna/Sa., Germany

[22] Filed: Aug. 26, 1969

[21] Appl. No.: 853,205

[52] U.S. Cl. ............................................. 250/83 CD
[51] Int. Cl. ................................................. G01t 1/04
[58] Field of Search .................................. 250/83 CD

[56] References Cited

UNITED STATES PATENTS

| | | | |
|---|---|---|---|
| 2,700,736 | 1/1955 | Roberts | 250/83 CD |
| 2,824,234 | 2/1958 | Schulte et al. | 250/83 CD |
| 2,848,625 | 8/1958 | Taplin et al. | 250/83 CD |
| 2,858,447 | 10/1958 | Taplin | 250/83 CD |
| 3,450,878 | 6/1969 | Pezdirtz et al. | 250/83 CD |

*Primary Examiner*—Walter Stolwein
*Assistant Examiner*—Davis L. Willis
*Attorney*—Tab T. Thein

[57] ABSTRACT

An indicator for dosage control in radiation processes in the Megarad range, consisting of a threshold-value dosage meter which comprises a transparent plastic material and incorporated therein an indicator for color change, a water-soluble organic halogen compound, and a water-soluble buffer compound, the color change being adjustable to energy doses between 0.5 and 10 Mrad by varying the contents of the buffer compound and the concentration of the halogen compound in the plastic material. The device is very useful in the sterilization of medical equipment by radiation and in the pasteurization of foodstuffs and for other purposes of radiation technique.

5 Claims, No Drawings

THRESHOLD VALUE DOSAGE METER

The present invention relates to a threshold-value dosage meter consisting of a foil of plastic material and serving as an indicator in the sterilization by radiation of medical equipment as well as in the pasteurization of foodstuffs and for other purposes of radiation technique.

Various threshold-value dosage meters are already known. Thus, the dosage meter following the system of halogenazodye-paraffin (so-called HAP dosage meter) indicates comparatively low energy doses by color change. It was especially developed for test measurements in radiation medicine.

For the purposes of radiation sterilization, especially of medical equipment, threshold-value dosage meters were developed which showed distinct and sharp color change at 2.5 Mrad. These systems contain polyvinyl chloride of low transparency, and as indicator an azo-dye with several additives, e.g., polyvinyl alcohol, paraffin or latex.

The known threshold-value dosage meters have the shortcoming that they can scarcely be photometrically evaluated due to their low transparency. A visual evaluation of the color change may lead to subjective errors in the determination of the dosis.

Some systems exhibit in addition a marked sensitivity to daylight.

It is the object of the present invention to provide a threshold-value dosage meter which is free of the disadvantages of known dosage meters.

It is a further object of the invention to provide a threshold-value dosage meter which is simple in design, made of inexpensive materials and can easily be evaluated objectively and visually.

It is another object of the invention to provide a dosage meter which shows a clear color change at the predetermined energy dose, is insensitive to ambient factors, e.g., daylight, heat and moisture.

It is yet another object of the dosage meter according to the invention to maintain the color caused by radiation over a period of several months.

Other objects and advantages of the dosage meters according to the invention will become apparent from the following detailed description.

According to the invention these objects are realized by providing a transparent foil of water-soluble polyvinyl alcohol (PVA) into which the following elements are incorporated: an indicator substance, an organic halogen compound, and a water-soluble buffer compound.

The preferred substances for incorporation are: methyl orange as indicator, chloral hydrate as halogen compound, and sodium tetraborate as buffer, but it should be understood that these substances are given by way of illustration and not of limitation.

With the above substances a transparent yellow foil is formed having an absorption maximum at a wavelength of 455 nm. After an irradiation of such a foil with an ionizing radiation, a sharp color change will occur from yellow to red at a certain energy dose, depending on the amount of chloral hydrate as halogen compound and of sodium tetraborate as buffer. The absorption maximum of the foil after color change is at a wavelength of 525 nm. Thus the color change can be regulated by the buffer concentration and the content in chloral hydrate; for the above given system, it can be adjusted from 0.5 to 10 Mrad.

The foil is prepared by evaporation of the aqueous solutions of all the substances used, on a siliconized support.

The threshold-value dosage meter according to the invention is easy to make with inexpensive materials. It is superior in its properties to the known dosage meters as follows. The change of color is sharp at an energy dose adjustable as desired between 0.5 and 10 Mrad. Evaluation of the indicated value can be made visually or photometrically. After color change has occurred by radiation, the foil is insensitive to daylight, and the color is stable for a period of several months.

In the following, two examples of threshold-value dosage meters according to the invention are described which show color change at different energy doses. Starting material:

8 percent aqueous solution of polyvinyl alcohol (PVA)

10 percent aqueous solution of chloral hydrate (pure)

$5 \times 10^{-4}$ m aqueous solution of recrystallized methyl orange (MO)

0.05 m aqueous solution of sodium tetraborate (p.A.)

EXAMPLE 1

250 ml of the polyvinyl-alcohol solution are mixed with 100 ml of the above methyl-orange solution and 45 ml of the sodium-tetraborate solution. The viscous mixture which forms is heated on a heating plate while stirring. After the solution has become thinly liquid and completely homogenized, it is cooled in air.

Then 20 ml of the 10 percent chloral-hydrate solution are added and the solution is thoroughly mixed by stirring.

The so obtained solution is poured on a siliconized support (20 by 40 centimeter square) and dried for about 7 days in air at room temperature. Obtained is a clear, yellow foil of a thickness of about 200 $\mu$m which easily separates from the support.

The so obtained threshold-value dosage meter changes color for an energy dose of 2.5 Mrad ( for 1.5 MeV electrons of a Van-de-Graaff generator at a dose output $D_L = 1.7 \times 10^5$ rad/s).

EXAMPLE 2

250 ml of the 8 percent polyvinyl-alcohol solution are mixed with 100 ml of the above methyl-orange solution and 80 ml of the sodium-tetraborate solution. Further treatment as in Example 1, but in this instance 100 ml of the 10 percent chloral-hydrate solution are added. The mixture is then treated according to Example 1.

This threshold-value dosage meter shows a color change at 1.25 Mrad (for $\beta$ radiation of an $^{90}Sr/^{90}T$ source at a dose output $D_L = 2.4 \times p^5$ rad/h).

What we claim is:

1. An indicator for dosage control in radiation processes in the Megarad range, consisting of a threshold-value dosage meter in the dry state which comprises a transparent plastic foil and incorporated therein an indicator for color change, a water-soluble organic halogen compound, and a water-soluble buffer compound, the color change being adjustable to energy doses between 0.5 and 10 Mrad by varying the contents of said buffer compound and the concentration of said halogen compound in said plastic foil.

2. The dosage meter as defined in claim 1, wherein said plastic foil consists of polyvinyl alcohol.

3. The dosage meter as defined in claim 1, wherein said color-change indicator is methyl orange.

4. The dosage meter as defined in claim 1, wherein said halogen compound is chloral hydrate.

5. The dosage meter as defined in claim 1, wherein said buffer compound is sodium tetraborate.

* * * * *

UNITED STATES PATENT OFFICE
CERTIFICATE OF CORRECTION

Patent No. 3,691,380      Dated September 12, 1972

Inventor(s) Klaus Hübner et al.

It is certified that error appears in the above-identified patent and that said Letters Patent are hereby corrected as shown below:

In the heading, under [73], the assignee's post-office address should appear as -- Dohna/Sa., Germany --; and in column 2, 57 (last text line before the claims), the equation should read -- $D_L = 2.4 \times 10^5$ rad/h --.

Signed and sealed this 30th day of January 1973.

(SEAL)
Attest:

EDWARD M. FLETCHER, JR.
Attesting Officer

ROBERT GOTTSCHALK
Commissioner of Patents